Nov. 1, 1949 S. S. ALLENDER 2,486,726
SHIPPING TAG
Filed March 30, 1946

S.S. ALLENDER INVENTOR.

BY
William H Brown

Patented Nov. 1, 1949

2,486,726

UNITED STATES PATENT OFFICE 2,486,726

SHIPPING TAG

Samuel S. Allender, Cleveland, Ohio, assignor to The Harshaw Chemical Company, Cleveland, Ohio, a corporation of Ohio Application March 30, 1946, Serial No. 658,381

5 Claims. (Cl. 282—19)

This invention relates to shipping tags and more particularly to a type of shipping tags adapted for shipment to a consignee and return by the consignee with a minimum of effort to mark the package for re-consignment.

One type of situation in which my improved shipping tags are useful is in the shipment of goods in returnable containers; that is, containers that are sent out full and returned empty for refilling and further shipment. These improved tags are useful also in other analogous situations, for example, for shipping goods to a repair establishment to be repaired and returned to the sender or for shipping goods to a prospective customer to be examined and returned if unsatisfactory. While these and other analogous uses will readily suggest themselves to persons skilled in the art, my invention will be described hereinafter with reference to use in connection with returnable containers.

The object of the invention, broadly stated, is to provide shipping tags composed of two portions so disposed that one of them is used for the outgoing trip and the other for the return trip, and the two parts being so related that no confusion can result due to the "return" tag being visible on the out-going trip. A further object is to minimize the chance that the tag can be injured on the out-going trip in a way that might result in exposing the "return" tag and thereby reversing the direction of shipment before the goods reach their destination. A further object is to provide a shipping tag construction including "out-going" and "return" tag portions so related to each other that when the address of the consignee for the out-going trip is written on the "out-going" tag portion, the "return" tag will at the same time be marked for the return trip with an indication of the name of the consignor as to the return trip.

Figure 1:
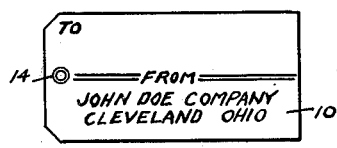
Figure 2:
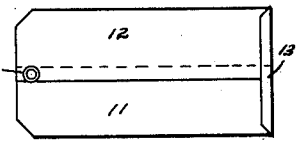
Figure 3:
Figure 4:
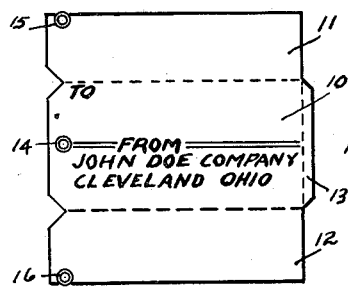
Figure 5:
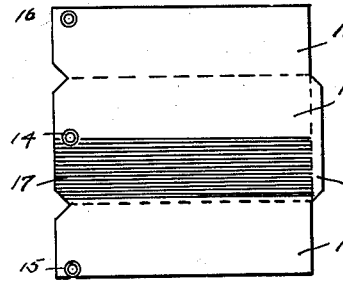
Figure 7:
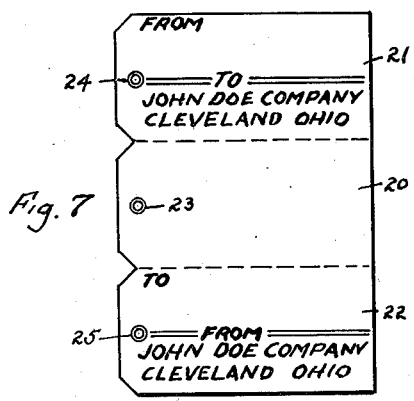
Figure 8:
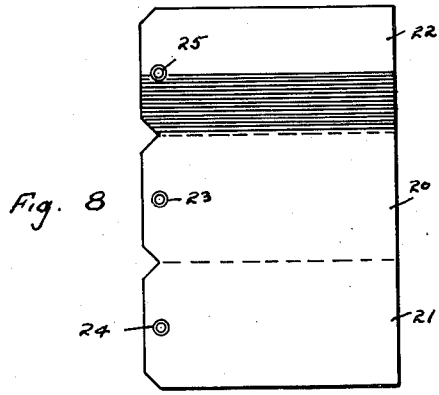
Figure 6:
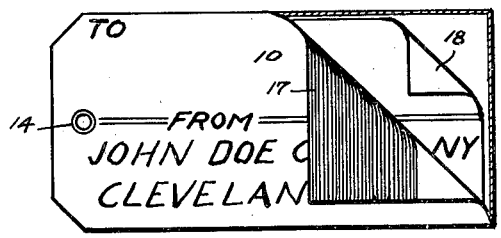

With the foregoing and other and more limited objects in view the invention consists in the various novel features indicated in this specification and illustrated in the accompanying drawings wherein Fig. 1 is a front elevation of one embodiment of the invention; Fig. 2 is a back view of the embodiment shown in Fig. 1; Fig. 3 is a front view of the "return" tag which is adapted to be received in the envelope shown in Fig. 1; Fig. 4 is a development of the envelope shown in Figs. 1 and 2, showing the outside surface; Fig. 5 is a similar development showing the inside surface; Fig. 6 is a view similar to Fig. 1 wherein, however, a portion of the envelope is folded back to show the relationship of the parts of the complete device, the "return" tag also being folded back to indicate its relationship to the envelope; Fig. 7 is a development of the front face of a modified form of the invention and Fig. 8 is a similar development showing the rear face.

Referring now to the drawings wherein similar reference characters indicate the same parts throughout, and describing first the form of the invention shown in Figs. 1 to 6 inclusive, the numeral 10 indicates the front face of an envelope provided with flaps 11, 12 and 13 which fold into place as indicated most clearly in Fig. 2 to form the envelope. It will be understood, of course, that these flaps are secured in the positions shown in Fig. 2 by means of suitable adhesive preferably of the waterproof variety. The envelope face is provided with a grommet 14 and the flaps 11 and 12 are provided with similar grommets 15 and 16 which register with the grommet 14 when the envelope is formed to the shape indicated in Figs. 1 and 2. The grommet 15 may be omitted if desired for the purpose of causing the overlapping edges of flaps 11 and 12 to be in contact throughout their lengths. The front face 10 of the envelope is divided into two spaces which may be designated as the "To" space and the "From" space. As indicated, the "From" space may contain the name of the consignor and may be printed. The "To" space is to contain the name of the customer or the consignee. On the back of the "To" space, the paper will be provided with a carbon coating 17 so that when the name of the customer or consignee is typed or otherwise written on the "To" space, a carbon copy can be made on the "return" tag within the envelope at the same time.

In Fig. 3 I have shown the "return" tag adapted to be received in the envelope of Figs. 1 and 2 and it will be noted that this "return" tag is of a size slightly smaller than the envelope so that it may be received therein. The "return" tag is designated by the numeral 18 and is provided with a grommet 19 which will register with the grommets 14, 15 and 16 when the "return" tag is placed in the envelope. It will thus be seen that on the out-going trip a wire may be passed through all the grommets for securing the tag to a returnable container.

The "return" tag, like the face of the envelope, is divided into two parts, a "From" space and a "To" space. In this case, however, it will be noted that the "From" space is so positioned that when the "return" tag 18 is placed in the envelope its "From" space will be directly under the "To" space on the envelope. In the case of the tag 18, the name of the consignor is placed in the "To" space and may be printed while the "From" space is left blank when the device is manufactured so as to receive by means of the carbon coating 17 the same name and address which is placed on the "To" space on the envelope face 10.

It will thus be seen that in use the device consists of an assembly which can be secured to a returnable container or package by means of a wire passing through the grommets 14, 15, 16 and 19 and which will have the name of the customer or consignee typed or otherwise written in the "To" space on the envelope and in the "From" space on the tag 18 which will be contained in the envelope. When the customer receives the consignment he unties the wire, slips the tag 18 out of the envelope, discards the envelope and re-attaches the tag 18 to the container by means of the wire passing through the grommet 19. The envelope and tag 18 will be composed of any suitable material such as tag linen, manila paper or plastic sheet materials if desired. Ordinarily I prefer to have the tag 18 composed of relatively heavy material while the envelope will be composed of material much lighter than the tag. In this way the envelope can be thin enough that it will not interfere with the transfer by means of the carbon coating 17 to the tag 18 of the material written in the "To" space on the envelope. At the same time, the tag 18 being relatively heavy will help to stiffen the envelope on the out-going trip so that it will not need to be as heavy as would otherwise be the case.

In Figs. 7 and 8 I have shown a modified form of the invention consisting of three portions 20, 21 and 22, each of tag size. The portion 20 contains no printed matter. The portion 22 will be used as the "out-going" tag while the portion 21 will be used as the "return" tag. The portion 22 is provided with a "To" space which is left blank and a "From" space on which is printed the name and address of the consignor. The "return" tag portion 21 is provided with a "From" space and a "To" space which contains the name and address of the consignor. On the back of the "To" space of the "out-going" tag 22 I provide a carbon coating as indicated in Fig. 8. The tag portions 20, 21 and 22 are provided respectively with grommets 23, 24 and 25 which are adapted to register when the tag portions are folded along the dotted lines. The dotted line between the portions 20 and 21 may and preferably does indicate a line of perforations to permit easy tearing of the "return" tag portion from the remainder of the assembly for the return trip. The dotted line between the portions 20 and 22 preferably does not indicate perforations but only a fold line so that it will be relatively difficult to tear along that line. When the tag assembly is to be used, the portion 21 is first folded against the portion 20 along the dotted line between the portions 20 and 21 with the printed matter on the outside. The portion 22 is then folded over with the printed matter on the outside and overlies the portion 21 with the carbon coating in contact with the "From" space of the portion 21. The name of the consignee is then typed or otherwise written on the "To" space of the "out-going" tag portion 22 and is transferred by means of the carbon coating to the "From" space on the "return" tag portion 21. Since the grommets 23, 24 and 25 will then be in registration, a wire may be passed through all three of such grommets and thus attach the tag assembly to the returnable container. When the consignee receives the container and empties it he unties the wire from the container, removes it from the grommets, tears off the "return" portion 21 along the line of perforations between the portions 21 and 20 and discards the portions 20 and 22. The wire is then passed through the grommet 24 and re-attached to the container for return shipment. It will be seen that the "return" tag portion 21 will be enclosed between the portions 20 and 22 and thus will be unlikely to become exposed during the out-going trip and will be kept in good condition for use on the return trip. I prefer to print in large letters on the back of the tag 18 and on the back of the "return" tag portion 21 the word "Empty" so as to indicate to the carrier that it is an empty container which is being returned.

While I have shown and described the present preferred embodiments of my invention, I wish it understood that other embodiments are possible and that I am limited only in accordance with the appended claims and the prior art.

Having thus described my invention, what I claim is:

1. A shipping tag including an "out-going" tag, a "return" tag and a portion connected to said "out-going" tag and cooperating therewith to enfold said return tag, indicia on the front faces of said tags indicating a division of the area thereof into "To" and "From" spaces, the "To" space so indicated on the "out-going" tag being in superposed relation to the "From" space so indicated on the "return" tag, a carbon surface carried by the "out-going" tag on the back thereof in contact with the "From" space of the "return" tag and means carried by said tags for attachment thereof to a shipping package.

2. A shipping tag in accordance with claim 1 further characterized in that said tags are integral with a connector element of approximately their own length and breadth whereby they may be folded into overlapping relation with the "return" tag enfolded between said "out-going" tag and said connector.

3. A shipping tag comprising an elongated envelope sealed along two sides and having at least one open end, registering openings in the front and rear faces of said envelope adjacent an open end, a "return" tag received in said envelope, being of approximately the same length and breadth as said envelope and having an opening adjacent one end located to register with said openings in said envelope, indicia on one face of said envelope indicating a division of the area thereof into "To" and "From" spaces, indicia on one face of said "return" tag indicating a division of the area thereof into a "From" space and a "To" space, the "To" space of said envelope being in superposed relation to the "From" space of said "return" tag and a carbon surface carried by the inner surface of said envelope in contact with the "From" space of said "return" tag.

4. A shipping tag comprising a piece of sheet material adapted to be folded into three portions one being an "out-going" tag portion, one being a "return" tag portion and the third being a connecting portion connecting the other two portions, said portions being of approximately equal width whereby they may be folded into overlapping relation with each other with one portion enfolded between the other two, indicia on said enfolded portion adapting it for use as a "return" tag and indicia on the other portion having a free edge adapting it for use as an "out-going" tag and a carbon surface on the back surface of said "out-going" tag in contact with the front surface of said "return" tag the front faces of said tag portions carrying indicia dividing the area into "To" and "From" spaces, the "To" space of the "out-going" tag being in superposed relation to the "From" space of said "return" tag.

5. A shipping tag including an "out-going" tag in the form of an envelope, a "return" tag adapted to be received in said envelope and being of approximately the same length and breadth as said envelope, said tags having indicia indicating a division of the areas thereof into "To" and "From" spaces, the "To" space so indicated on the face of the "out-going" tag being in superposed relation to the "From" space so indicated on the "return" tag, a carbon surface carried by the face of the "out-going" tag on the back surface thereof in contact with the "From" space of the return tag, and means carried by said tags for attachment thereof to a shipping package.

SAMUEL S. ALLENDER.

REFERENCES CITED

The following references are of record in the file of this patent:

UNITED STATES PATENTS

| Number | Name | Date |
| --- | --- | --- |
| 675,137 | O'Connor | May 28, 1901 |
| 2,405,511 | Moen | Aug. 6, 1946 |

FOREIGN PATENTS

| Number | Country | Date |
| --- | --- | --- |
| 227,015 | Great Britain | Jan. 8, 1925 |